US011449821B2

(12) United States Patent
Malhotra et al.

(10) Patent No.: US 11,449,821 B2
(45) Date of Patent: Sep. 20, 2022

(54) SYSTEMS AND METHODS FOR USE IN FACILITATING VERIFIED DELIVERIES (71) Applicant: MASTERCARD INTERNATIONAL INCORPORATED, Purchase, NY (US)

(72) Inventors: Sandeep Malhotra, Greenwich, CT (US); Rajat Maheshwari, Singapore (SG); Prashant Sharma, Madison, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 245 days.

(21) Appl. No.: 16/513,543

(22) Filed: Jul. 16, 2019

(65) Prior Publication Data
US 2021/0019698 A1    Jan. 21, 2021

(51) Int. Cl.
G06Q 10/08    (2012.01)
G06K 19/06    (2006.01)
G06K 7/14     (2006.01)
B64C 39/02    (2006.01)

(52) U.S. Cl.
CPC ....... *G06Q 10/0832* (2013.01); *B64C 39/024* (2013.01); *G06K 7/1417* (2013.01); *G06K 19/06037* (2013.01); *B64C 2201/128* (2013.01)

(58) Field of Classification Search
CPC .. G06Q 10/08; G06Q 10/083; G06Q 10/0831; G06Q 10/087; G06Q 10/0875
USPC ......... 705/332, 330, 338, 1.1, 380; 235/385, 235/384, 376, 375
See application file for complete search history.

(56) References Cited

U.S. PATENT DOCUMENTS

| 9,768,963 | B2 | 9/2017 | Chu et al. |
| 10,454,924 | B1 | 10/2019 | Jain |
| 10,614,507 | B2 | 4/2020 | Patel et al. |
| 10,623,403 | B1 | 4/2020 | Gupta et al. |
| 2013/0223279 | A1 | 8/2013 | Tinnakornsrisuphap et al. |
| 2013/0245849 | A1 | 9/2013 | Paul et al. |

(Continued)

FOREIGN PATENT DOCUMENTS

| CA | 3061388 A1 * | 5/2020 | .......... H04W 12/069 |
| CN | 107944853 A | 4/2018 | |

(Continued)

*Primary Examiner* — Edwyn Labaze
(74) *Attorney, Agent, or Firm* — Harness, Dickey & Pierce, P.L.C.

(57) ABSTRACT

Systems and methods are provided for distributing parcels to users by way of unmanned devices. One computer-implemented method includes actuating a locking mechanism of a compartment of the unmanned device to secure a parcel within the compartment and receiving, from a parcel provider associated with delivering the parcel to a user, a delivery location and a hashed key for the parcel. The method then also includes, at the delivery location of the parcel: capturing an image of a computer-readable indicia representative of a hashed key from the user; determining that the hashed key from the user and the hashed key received from the parcel provider match; and when the hashed keys match, actuating the locking mechanism associated with the compartment of the unmanned device to enable the user to access the compartment and retrieve the parcel.

20 Claims, 3 Drawing Sheets

(56) References Cited

U.S. PATENT DOCUMENTS

| | | | |
|---|---|---|---|
| 2015/0317597 A1* | 11/2015 | Shucker | G06Q 10/0833 |
| | | | 235/375 |
| 2016/0012393 A1* | 1/2016 | Wang | G06Q 10/08355 |
| | | | 705/338 |
| 2016/0171479 A1 | 6/2016 | Prakash et al. | |
| 2016/0321651 A1 | 11/2016 | Douglas | |
| 2017/0132630 A1 | 5/2017 | Castinado et al. | |
| 2017/0147975 A1* | 5/2017 | Natarajan | G05D 1/0676 |
| 2017/0203857 A1* | 7/2017 | O'Toole | A47G 29/141 |
| 2017/0293301 A1* | 10/2017 | Myslinski | G06Q 30/0202 |
| 2017/0302641 A1 | 10/2017 | Ramatchandirane et al. | |
| 2017/0320569 A1* | 11/2017 | Gordon | B64C 39/024 |
| 2017/0345394 A1 | 11/2017 | Bansal et al. | |
| 2018/0018660 A1 | 1/2018 | Gomes et al. | |
| 2018/0077156 A1 | 3/2018 | Ellingson et al. | |
| 2018/0159855 A1 | 6/2018 | Ha et al. | |
| 2018/0167394 A1* | 6/2018 | High | H04L 63/123 |
| 2018/0232734 A1 | 8/2018 | Smets et al. | |
| 2018/0244404 A1* | 8/2018 | Park | B64D 1/22 |
| 2018/0373238 A1* | 12/2018 | Bergan | G05D 1/104 |
| 2019/0057199 A1 | 2/2019 | Hutchinson | |
| 2019/0102730 A1* | 4/2019 | Giorgi | B64D 1/22 |
| 2019/0109842 A1 | 4/2019 | Kumar et al. | |
| 2020/0202284 A1* | 6/2020 | Singh | G06Q 10/083 |
| 2020/0250908 A1* | 8/2020 | Shah | G07C 9/38 |
| 2020/0402044 A1 | 12/2020 | Vyas et al. | |
| 2021/0021589 A1 | 1/2021 | Malhotra et al. | |
| 2021/0051012 A1 | 2/2021 | Law | |
| 2021/0280074 A1* | 9/2021 | Ali | G06F 21/64 |
| 2021/0336797 A1* | 10/2021 | Van Duren | H04L 9/0643 |

FOREIGN PATENT DOCUMENTS

| | | | | |
|---|---|---|---|---|
| CN | 109071015 A | * | 12/2018 | B64F 1/32 |
| KR | 102212287 B1 | * | 2/2021 | |

\* cited by examiner

SYSTEMS AND METHODS FOR USE IN FACILITATING VERIFIED DELIVERIES

FIELD

The present disclosure generally relates to systems and methods for use in effecting verified deliveries, and in particular, to systems and methods for use in directing parcels to recipients, carried by unmanned devices (e.g., drones, balloons, planes, etc.), whereupon delivery is permitted based on verifying user identities.

BACKGROUND

This section provides background information related to the present disclosure which is not necessarily prior art.

Users are known to use payment accounts to fund transactions at merchants for the purchase of products. In addition, merchants are known to provide both physical and virtual locations through which the users are permitted to purchase selected products. When products are purchased away from the merchants' physical locations, or even at the merchants physical locations, the merchants and/or users may arrange for delivery of the product(s) to the users' residences or other locations designated by the users. The deliveries may be accomplished through carriers such as FedEx®, UPS®, or USPS®, etc. Additionally, or alternately, the merchants themselves may facilitate delivery of the product(s) directly. Further, the manners and entities involved in such deliveries may be based, at least in part, on the nature of the product(s) purchased.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

When a user orders and/or purchases one or more products from a merchant, the user may coordinate delivery of the product(s) to a residence of the user or a location designated by the user (e.g., a work location of the user, a current location of the user, etc.). When a parcel (including the product(s)) is delivered, a person associated with the delivery may be required to request a signature for the product and/or verify the user upon delivery of the product(s). When unmanned devices are employed to facilitate such delivery of the corresponding parcel, verifying the identity of the user (i.e., as the person to which the parcel is directed) may be problematic. Uniquely, the systems and methods herein permit a digital identity bound to a communication device, associated with a user, to enable verification of the user in connection with delivery of a parcel to the user. In particular, once the user registers his/her identity with an identity backend, a parcel provider may activate an unmanned device to deliver the parcel to the user. The unmanned device is provided with a hashed key, based on an ID of the unmanned device and a unique ID associated with the user. In the meantime, the user is provided with the ID for the unmanned device, which permits the communication device associated with the user to generate a hashed key identical to the hashed key provided to the unmanned device. When a match is determined between the two hashed keys, the unmanned device actuates a locking mechanism to enable the user to retrieve the parcel from a compartment of the unmanned device. In this manner, a user-verified delivery of the parcel is provided via the unmanned device.

Figure 1:
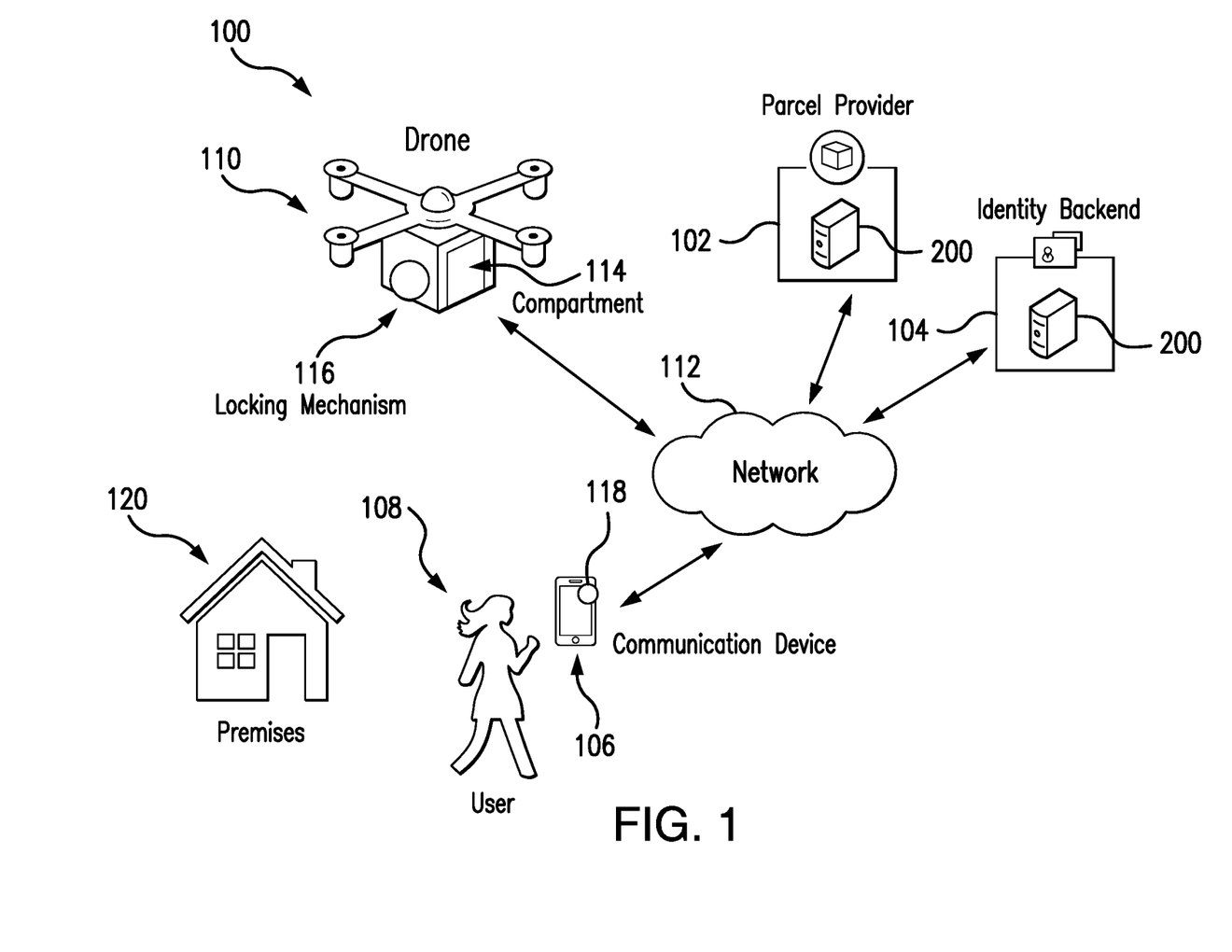
FIG. 1 illustrates an exemplary system of the present disclosure suitable for use in effecting distribution of parcels to users by unmanned devices, based on verified identities of the users.

FIG. 1 illustrates an exemplary system 100 suitable for use in distributing parcels to recipients, and in which one or more aspects of the present disclosure may be implemented. Although the system 100 is presented in one arrangement, other embodiments may include the parts of the system 100 (or other parts) arranged otherwise depending on, for example, the manner of shipping parcels to users, types of products included in parcels, configurations of parcels being delivered, involvement of other entities in the shipping of the parcels, manners of identifying locations of users, types/configurations of unmanned devices used to deliver parcels, etc.

The system 100 generally includes a parcel provider 102, a digital identity backend 104, a communication device 106 associated with a user 108, and an unmanned device (e.g., drone 110, etc.), each of which is coupled to (and is in communication with) network 112. The network 112 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

In general herein, the parcel provider 102 is a source of a parcel to be delivered to the user 108. The parcel may include any suitable product, but in various examples, the product includes a document, such as a passport, a driver's license, an identification or payment device, etc. Other example products may include, without limitation, computer readable media, electronics (e.g., smartphones, etc.), jewelry, medication, etc. In general, the product as referenced herein will be a product for which the parcel provider 102 desires verification of the user 108 in connection with delivery of the parcel containing the product to the user 108. In general, the product will have an identifying number associated therewith and specific thereto, such as a passport number, a driver's license number, an order number, a device ID number, etc. It should be appreciated that the parcel may include multiple products in various embodiments, whereby the parcel provider 102 packages, for example, the multiple products together in the parcel for delivery to the user 108.

The identity backend 104 may include any entity involved in the compilation and dissemination of digital identities. For example, the identity backend 104 may include a payment network, such as, for example, provided by Mastercard Corporation, etc., or another entity (e.g., not associated with financial technology, etc.) In general, the identity backend 104 provides an application 118 to users, for installation at their communication devices, associated with digital identities of the users. In this exemplary embodiment, the application 118 is installed and active in the communication device 106 associated with the user 108. The identity backend 104 is configured to then interact with the application 118 to provide operations related to a digital identity of the user 108 as described in more detail below. It should be appreciated that the application 118 may include a software development kit (SDK) provided from the identity backend 104, whereby the SDK may be integrated into an application having other main purposes (e.g., a banking application, a digital wallet, etc.) to extend the operations described herein to that application.

In the system 100, the parcel (originating from the parcel provider 102) is to be delivered to the user 108 by drone 110, which in general is an unmanned device suited to deliver the parcel from the parcel provider 102 to the user 108. In connection herewith, the drone 110 includes one or more actuators for aerodynamically moving the drone 110 between different locations through the air (e.g., motors, engines, propellers, etc. as generally known). That said, while the unmanned device is illustrated as drone 110 in FIG. 1, it should be appreciated that the unmanned device may include other devices in other embodiments, for example, an unmanned balloon, an unmanned plane, etc.

In the illustrated embodiment, the drone 110 is associated with a unique drone ID. The drone 110 may be operated from a control station on the ground, or may be operated autonomously (based on computer executable instructions therein) consistent with a given instruction to proceed to a specific location, as identified by latitude or longitude (or otherwise) (e.g., a home address of the user 108, etc.), or potentially, a desired location of the user 108 (e.g., as indicated by the communication device 106 (e.g., based on a beacon transmission by the communication device 106, etc.), etc.), etc. In addition to flight, the drone 110 includes a parcel compartment 114, which is sufficiently sized to carry the parcel (and, potentially, other parcels for the same user 108, or divided so as to carry different parcels for multiple users), but sufficiently limited to permit (and not affect or hinder) the flight of the drone 110 from one location to another location. The parcel compartment 114 includes an access panel (e.g., a door, etc.) and a locking mechanism 116 (e.g., an electronic lock, etc.) associated with the access panel, which is configured to actuate, to either permit access to the compartment 114 via the access panel (e.g., in an open position or configuration, etc.) or to secure the compartment 114 (e.g., in a closed positon or configuration, etc.). That said, the locking mechanism 116 may include one or more latches, magnets, etc. configured to secure the access panel in a closed position (broadly, locking means, etc.). In some embodiments, the drone 110 may include multiple compartments each with its own locking mechanism, whereby the drone 110 may carry parcels for multiple different users.

With continued reference to FIG. 1, the communication device 106 may include, without limitation, a smartphone, a tablet, etc. Often, the communication device 106 includes a portable communication device, such that it may be carried with the user 108 when the user 108 moves from location to location. As shown, the communication device 106 includes the network-based application 118, which is installed, in whole or in part, at the user's communication device 106. The network-based application 118 may include executable instructions to perform the operations described herein.

Further, the user 108 is associated with a premises 120, which is associated with a location (e.g., designated by longitude and latitude, address, etc.). The premises 120 may include, for example, a home, an apartment, an office building, or other structure or area, etc. In general, the premises 120 may include any location at which the user 108 may opt or decide to have one or more parcels delivered (e.g., in some embodiments, the premises may be a location in a parking lot, or a location in an open area where the user is currently located, etc.).

While only one parcel provider 102, one identity backend 104, one communication device 106, and one drone 110 are illustrated in FIG. 1, it should be appreciated that any number of these entities (and their associated components) may be included in the system 100, or may be included as a part of systems in other embodiments, consistent with the present disclosure. Likewise, it should be appreciated that the system 100 is not limited to only one user 108 as numerous users (and associated communication devices) will likely be included in various implementations of the systems and methods described herein.

Figure 2:
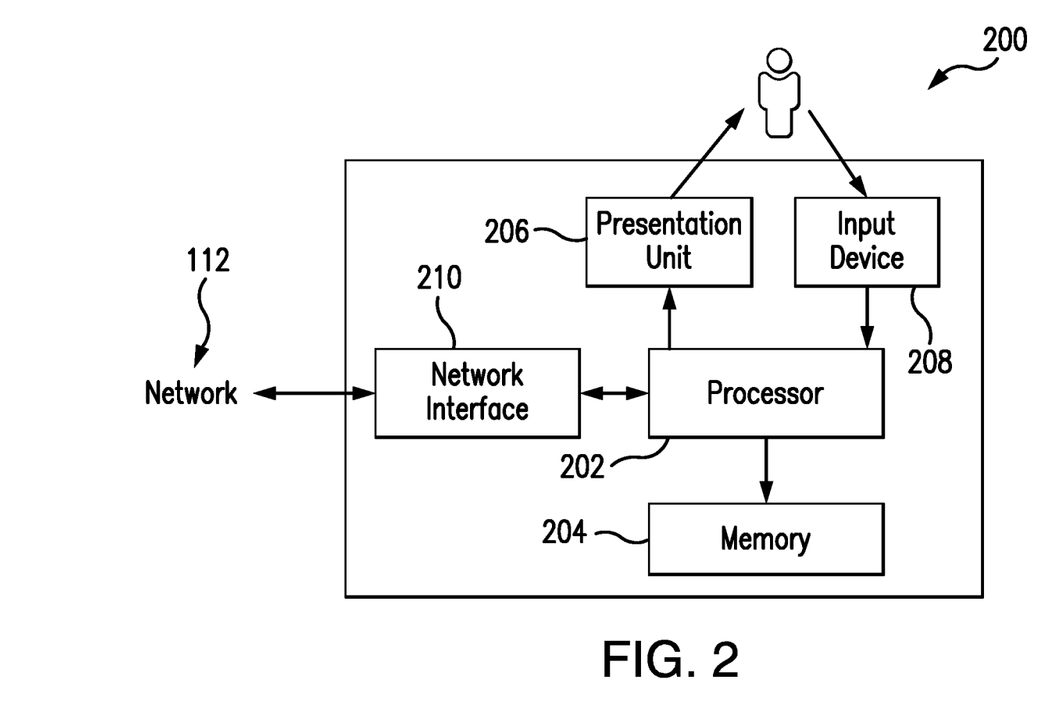
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the parcel provider 102, the backend 104, the communication device 106, and the drone 110 are integrated into and/or implemented in a computing device similar to (and consistent with) the computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity profile data, identifying data profiles, location data, parcel delivery files, drone IDs, user IDs, payment account credentials, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein (e.g., one or more of the operations of method 300, etc.), such that the memory 204 is a physical, tangible, and non-transitory computer readable storage media. Such instructions often improve the efficiencies and/or performance of the processor 202 and/or other computer system components configured to perform one or more of the various operations herein (whereby execution of such instructions to cause performance of the operations may transform the computing device into as special purpose device). It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., options for delivery protection, etc.), visually, for example, to a user of the computing device 200, such as the user 108 in the system 100, etc. And, various interfaces (e.g., as defined by network-based applications, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) such as, for example, inputs by the user 108 to the communication device 106 to purchase a product, to designate delivery of the product, etc. The input device 208 may include a single input device or multiple input devices. The input device 208 is coupled to (and is in communication with) the processor 202 and may include, for example, one or more of a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC™) adapter, a Bluetooth™ adapter, etc.), a mobile network adapter, or other device capable of communicating to one or more different networks, including the network 112. Further, in some exemplary embodiments, the computing device 200 may include the processor 202 and one or more network interfaces incorporated into or with the processor 202. In various embodiments, the computing device 200 also includes global positioning system (GPS) capability whereby the computing device 200 may determine its current geographic location, etc. For example, the GPS capability of the drone 110 may be used to determine and transmit a location of the drone 110 to an operator, and the GPS capability of the communication device 106 may be used to determine and transmit a location of the user 108, for use as described below. Similarly, the computing device 200 may be configured to determine a current geographic location of the communication device 106 in a similar manner.

In various embodiments herein, in connection with providing the GPS capability, the input device 208 and/or the network interface 210 may include, among other things, a GPS antenna suitable to capture GPS signals for processing by the processor 202 to determine the location of the computing device 200 (e.g., in connection with the drone 110, the users' communication device 106, etc.). In addition (or alternatively), in various embodiments herein, the computing device 200 may rely on additional or other network signals, via network interface 210, to determine its location. With that said, it should be appreciated that any suitable operations to determine locations, by processors, based on GPS signals (or other network signals) may be used.

Referring again to FIG. 1, in various exemplary embodiments, the user 108 registers an identity provider with the application 118 and/or the identity backend 104 (associated with the application 118). Initially, when the application 118 is installed by the user 108, the communication device 106, as configured by the application 118, solicits identity details from the user 108. Specifically, the communication device 106 is configured to solicit, without limitation, a name, an address, telephone number(s), email address(es), biometric(s) (e.g., selfie image(s), fingerprint(s), etc.), images of government identification documents (e.g., a driver's license, a passport, etc.), etc. The identifying data may be solicited through one or more interfaces, or a sequence of interfaces at the communication device 106 (e.g., at the presentation unit 206 thereof, etc.), etc. In at least one embodiment, the communication device 106, as configured by the application 118, captures identifying information from the communication device 106 and/or other applications installed therein to limit the requirement for the user 108 to enter specific identifying data.

Upon receipt of the identifying data, the communication device 106 is configured to store the data securely therein (e.g., in a secure element (SE) in memory 204 of the communication device 106, etc.), etc. In addition, the communication device 106 is configured, by the application 118, to share at least a portion of the identifying data with the identity backend 104 (e.g., based on registration of the user 108, etc.). For example, the communication device 106, as configured by the application 118, may share the phone number and/or email address of the user 108 with the identity backend 104 (e.g., contact information for the user 108 and/or the user's communication device 106, etc.). In response, the identity backend 104 is configured to generate and transmit a one-time-passcode (OTP) to the communication device 106, via an SMS message when a phone number is provided and/or via email when an email address is provided. Upon receipt of the OTP, the user 108 accesses the application 118, at the communication device 106, and enters the OTP to an interface (through the application 118) associated with verifying an identity of the user 108. The communication device 106, as configured by the application 118, then transmits the OTP received from the user 108 to the identity backend 104 to verify the OTP. When verified (i.e., the OTP received from the communication device 106 matches the OTP sent by the identity backend 104), the identity backend 104 is configured to transmit a confirmation to the communication device 106, whereupon the identity of the user 108 is verified and the application 118 is permitted to cause the communication device 106 to operate as described herein (based on the verification).

It should be appreciated that when verified, the identifying data, making up a digital identity for the user 108, may also be stored at the identity backend 104 (e.g., the communication device 106 may transmit the data received from the user 108 to the identity backend 104 in an encrypted manner, etc.), whereby subsequent identity verification of the user 108 may involve interaction with the identity backend 104.

It should also be appreciated that verification of the phone number and/or the email address of the user 108 may be sufficient for some implementations (to verify the user 108), but not others. In such other implementations, the communication device 106, as configured by the application 118, may coordinate with the identity backend 104 to provide further verification of identifying data provided to the communication device 106, by the user 108. For example, the identity backend 104, or entity associated therewith, may be configured to provide validation and verification of a biometric of the user 108, alone or relative to an image of a document from the communication device 106. That is, for example, the identity backend 104 may be configured to receive a name and a biometric for the user 108 from the communication device 106, and to then confirm with a third-party biometric repository that the biometric is specific to at least the user's name. In another example, the identity backend 104 may be configured to receive a name, an image of a document and a biometric (e.g., a selfie image, etc.) for the user 108 from the communication device 106, and then may be configured to confirm the biometric and the name against the image of the document. With that said, various other validation and/or verification flows and techniques of the user's identifying data may be implemented in other embodiments.

In addition to identifying data, the user 108 may further provide one or more payment account credentials (e.g., associated with a credit card, a debit card, a prepaid card, etc.) to the application 118, whereupon the communication device 106, as configured by the application 118, stores the payment account credential with or in association with the identifying data (e.g., in the SE, etc.). The payment account credential(s) may or may not be transmitted to the identity backend 104 for association with the digital identity of the user 108.

Thereafter, when the user 108 completes a purchase of the product from a merchant, for example, the user 108 may request the parcel provider 102 (directly or via the merchant) to deliver the parcel (having the product purchased by the user 108) to the user 108 at the premises 120, via the drone 110. In response, the parcel provider 102 is configured to select the drone 110 for delivery of the parcel (from multiple available drones, etc.) and to scan the drone ID from the drone 110. The drone ID may be 123-456-789, for example, and is unique to the specific drone 110. The parcel provider 102 is also configured to capture a unique identifier associated with the parcel (broadly, a parcel ID or product ID), such as, for example, a passport number (when the product is a passport document) (e.g., passport ID 12121212, etc.), or other ID associated with the product/parcel, etc. Then, when the parcel is loaded into the compartment 114 of the drone 110, the locking mechanism 116 of the drone 110 is engaged to secure the parcel within the compartment 114. At that time, the parcel provider 102 is configured to generate a hashed key (e.g., a computer-readable indicia (e.g., a barcode or QR code, etc.) representative of the hashed key, etc.) for the drone 110 based on the drone ID, the parcel ID, and a timestamp associated with generation of the hashed key (or, alternatively, departure of the drone 110 in making the delivery, etc.) (whereby the timestamp may help inhibit attempted use of old, stale, static, etc. hashes by fraudulent users, etc.). It should be appreciated that any suitable hashing technique may be used to generate the hash (e.g., a one-way hash, etc.).

In turn, the parcel provider 102 is configured to provide the hashed key, a name of the user 108, and a delivery address or other location data for the delivery to the drone 110, whereby the drone 110 is configured to store the data therein (e.g., in memory 204 associated with the drone 110, etc.). The parcel provider 102 then releases the drone 110 for delivery of the parcel. The parcel provider 102 is also configured to generate and transmit a notification to the user 108, which includes either the hashed key, or the data upon which the hashed key is generated, or the drone ID, etc. In particular, the parcel provider 102 is configured to transmit the message to the user 108 via the application 118 of the communication device 106.

Next, once released, the drone 110 is configured to initiate a flight from its current location to the delivery address/location of the user 108 (with the parcel). In some embodiments, this may include providing the drone 110 with an address for the location of the user 108 (e.g., for the premises 120, etc.) or coordinates for the location of the user 108. In other embodiments, the communication device 106, as configured by the application 118, may emit a location beacon signal (indicative of a GPS location) to the drone 110 and/or to the parcel provider 102 whereby the drone 110 is configured to home in on the communication device 106, rather than fly to a specific static address.

When the drone 110 arrives at the delivery address, the user 108 physically captures the drone 110 and accesses the application 118. When the application 118 is accessed, the communication device 106, as configured by the application 118, generates a hashed key for the drone 110, based on data included in the message received from the parcel provider 102 and/or data already available to the user 108. For instance, where the message received from the parcel provider 102 includes the drone ID, the parcel ID, and the timestamp, the communication device 106 is configured (via the application 118) to generate the hashed key for the drone 110 (e.g., a computer-readable indicia (e.g., a barcode or QR code, etc.) representative of the hashed key, etc.). Alternatively, where the message received from the parcel provider 102 includes the hashed key (as generated by the parcel provider 102), the communication device 106 will then be in possession thereof based on the message (without the need to separately generate the same). In either case, the communication device 106, as configured by the application 118, displays the hashed key at the presentation unit 206 of the communication device 106 (e.g., in the form of the computer-readable indicia (e.g., a barcode or QR code, etc.) representative of the hashed key, etc.). The user 108 then provides an input to the drone 110 (e.g., presses a button (or input device 208), etc.) and presents the hashed key to the drone 110 (e.g., to a camera input device of the drone 110, etc.).

In response, the drone 110 is configured to capture the hashed key from the communication device 106. The drone 110 is configured to then compare the captured hashed key to the hashed key stored therein by the parcel provider 102 and determine if they match or not (e.g., determine if they are the same or not, etc.). If there is a match (based on generally known techniques for comparing hashed keys), the drone 110 is configured to actuate the locking mechanism 116 to permit the user 108 to access the compartment 114 through the access panel and retrieve the parcel (e.g., the passport, etc.). The user 108 then returns the access panel to a closed position, whereupon the drone 110 is configured to actuate the locking mechanism 116 and secure the access panel and to initiate flight to return to the parcel provider 102 (or to proceed to a subsequent delivery).

It should be appreciated that in a different embodiment, the drone 110 may instead be configured to display a computer-readable indicia (e.g., representative of a drone ID for the drone 110, etc.) to the user 108. In turn, the communication device 106, as configured by the application 118, may capture the computer-readable indicia, generate a hashed key based on at least the drone ID and a parcel ID stored in the communication device 106, and transmit an access request to the parcel provider 102 including the hashed key. The parcel provider 102, in turn, may be configured to compare the received hashed key to a hashed key generated by the parcel provider 102 (e.g., determine if they match or not (e.g., determine if they are the same or not, etc.), etc.) and issue an access command to the drone 110 when there is a match. The drone 110 then may be configured to receive the access command and actuate the locking mechanism 116 to permit the user 108 to access the compartment 114 through the access panel and retrieve the parcel (e.g., the passport, etc.).

It should be appreciated that other variations of the data flow, of the hashed keys, for example, may be included in other embodiments within the scope of the present disclosure. And, again, it should also be appreciated that the drone 110 is illustrated in the system 100 simply as an example of an unmanned device that may be used to effect delivery of parcels to users. Other unmanned devices may be used in the system 100 in other embodiments, without departing from the scope of the present disclosure.

Figure 3:
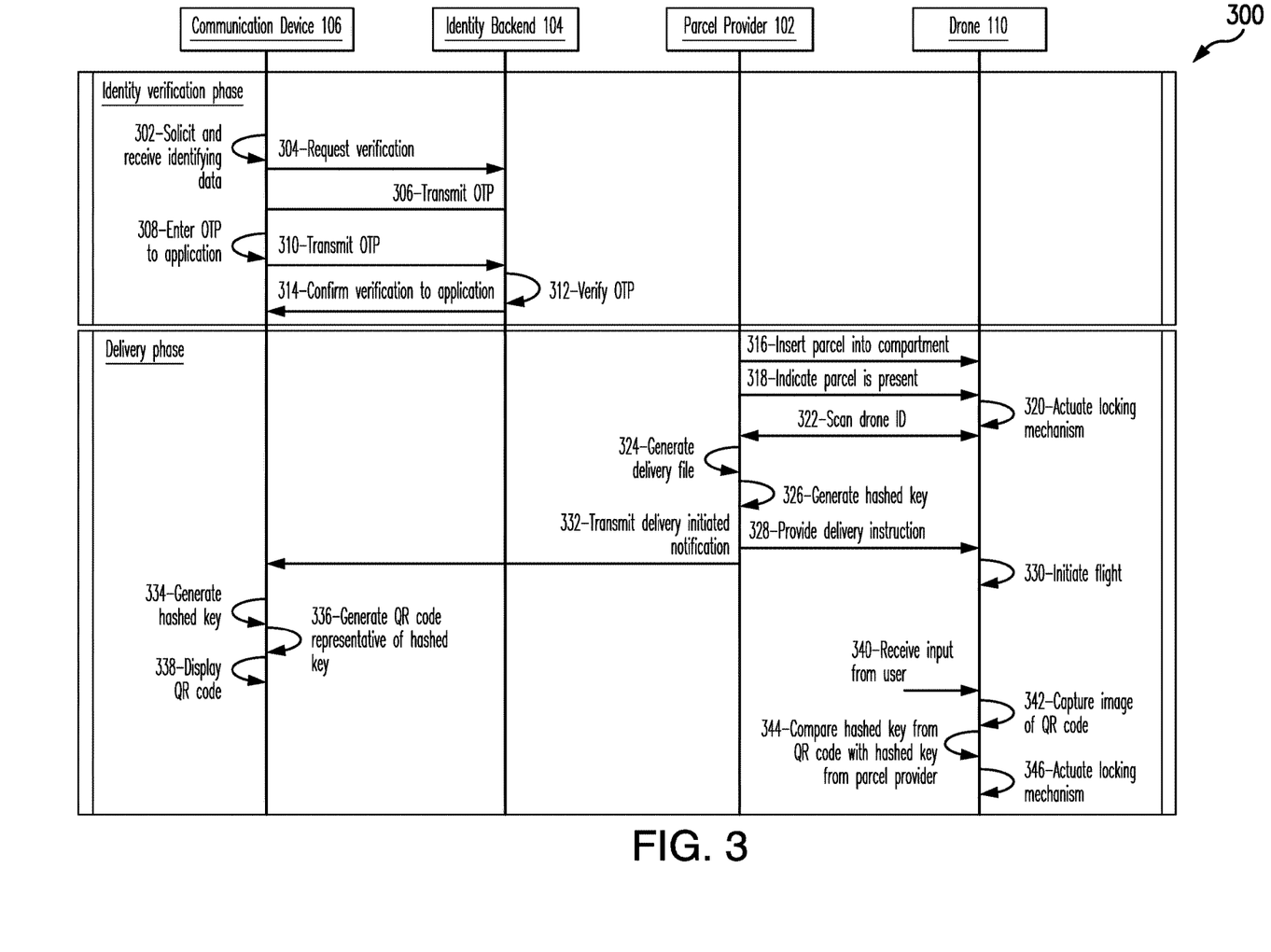
FIG. 3 is a flow diagram of an exemplary method, which may be implemented in connection with the system of FIG. 1, for distributing a parcel to a user whereupon the user, associated with the parcel, is verified to facilitate delivery of the parcel from an unmanned device to the user.

FIG. 3 illustrates an exemplary method 300 for use in distributing a parcel to a user via an unmanned device, whereupon the user associated with the parcel is verified through use of his/her communication device in order to facilitate delivery of the parcel from the unmanned device to the user. The exemplary method 300 is described as implemented generally in the system 100 and the communication device 106 (with exemplary reference to the drone 110 as the unmanned device). The method 300 is also described with reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the exemplary method 300.

At the outset, the method 300 generally includes an identity verification phase and a delivery phase. As part of the identity verification phase, the communication device 106 (as configured by the application 118, throughout the description of the method 300) solicits and receives, at 302, identifying data from the user 108. Specifically, one or more interfaces are displayed, by the application 118, to the user at the communication device 106 (e.g., at the presentation unit 206 thereof, etc.), which solicit from the user 108, for example, one or more of a name, a mailing address, a phone number, an email address, a passport number, a driver's license number, a biometric (e.g., a selfie image, etc.), images of identifying documents (e.g., a passport, a driver's license, a government ID card, etc.), etc. When the user 108 provides this data, it is received by the communication device 106 and compiled, by the communication device 106 (e.g., as configured by the application 118, etc.), into an identifying data profile for the user 108. And, the profile is stored, by the communication device 106, in memory (e.g., in a secure element (SE) within the memory 204 of the communication device 106, etc.). Additionally, or alternatively, at least some of the identifying data for the user 108 may be retrieved by the communication device 106 from memory 204 of the communication device 106 and/or from other applications installed at the communication device 106 (e.g., upon approval from the user 108, etc.).

In connection therewith, the communication device 106 verifies the identifying data received from the user 108 and/or otherwise compiled into the profile for the user 108. In particular, the communication device 106 requests, at 304, verification of an identity of the user 108 from the identity backend 104. The request includes certain identifying data for the user 108 (as received from the user 108 at operation 302, for example), including, without limitation, an email address and/or a phone number. The identifying data may further include a name, a mailing address, a biometric, a document image, etc. for the user 108 and an application ID associated with the application 118, thereby providing sufficient identifying data for the identity backend 104 to identify the use 108 and, potentially, form a digital identity for the user 108.

In response, the identity backend 104 generates an OTP and transmits, at 306, the OTP to the communication device 106 via a SMS message and/or an email message, which utilizes the identifying data provided from the user 108 as a basis for the SMS message and/or the email message (i.e., the phone number and/or the email address, etc.). The user 108, in turn, receives the OTP at the communication device 106, as a SMS message or via an email message at the communication device 106 or other device. It should be appreciated that if the phone number is not correct or the email address is not correct, the SMS message and/or the email will not be directed to the user 108 (whereby the method 300 then ends and/or the verification phase is restarted, etc.). Upon receipt of the OTP, the user 108 accesses the application 118 and enters, at 308, the OTP to the application (e.g., in an interface associated with verifying the user's identity as provided through the application 118, etc.). In response, the communication device transmits, at 310, the OTP to the identity backend 104.

Upon receipt of the OTP, the identity backend 104 verifies, at 312, the OTP based on matching the OTP received from the communication device 106 to the OTP transmitted to the user 108 (at 306). When there is a match, the user 108 and/or the communication device 106 is verified, and the identity backend 104 confirms, at 314, the verification of the user 108 to the application 118, which permits the application 118 to be activated and/or enabled for identity related operations (e.g., such that identity attributes of the user 108 may only be used through the application 118 once they are verified by the identity backend 104, etc.).

Thereafter, the user 108 may rely on the identity verification of the application 118 for various purposes. For instance, in the delivery phase of the method 300, the application 118 may be used to verify the identity of the user 108 in connection with a drone parcel delivery of a passport (broadly, a parcel) to the user 108. In particular, the parcel provider 102 may be in possession of a newly issued passport for the user 108, with the need to deliver the passport to the user 108 as soon as possible and to only permit the user 108 to take possession of the passport when the user's identity is verified.

As such, at the outset in the delivery phase of the method 300, based on the delivery requirements for delivering the passport to the user 108, the parcel provider 102 selects the drone 110 to deliver the passport to the user 108. As such, the parcel provider inserts, at 316, the parcel (i.e., the passport in this example) into the compartment 114 of the drone 110 and indicates, at 318, via the input device 208 of the drone 110 (e.g., a "Load Complete" button) that the parcel is present. In response to the input, at 320, the drone 110 actuates the locking mechanism 116 to secure the parcel inside the compartment of the drone 110.

The parcel provider 102 then scans (or otherwise records), at 322, a drone ID from the drone 110, via a QR code or barcode on the side of the drone 110, or as a RFID emitted from the drone 110, or as presented in plain text on the side of the drone 110, or otherwise, etc. Once the drone ID is known to the parcel provider 102, the parcel provider 102 generates, at 324, a delivery file for the parcel, which includes the drone ID, a location of the user 108 (or delivery location designated by the user 108), and a unique ID associated with the parcel, etc. The unique ID for the parcel in this exemplary embodiment is a passport number for the passport to be delivered. From the delivery file, then, the parcel provider 102 generates, at 326, a hashed key for the delivery of the parcel, which is based on the drone ID, the unique ID for the parcel, and a timestamp associated with the delivery (e.g., associated with a time and/or date of generation of the hashed key, etc.). In so doing, the parcel provider 102 may also generate a QR code (or other computer-readable indicia) representative of the hashed key.

Thereafter, the parcel provider 102 provides a delivery instruction to the drone 110, at 328, where the instruction includes a location of delivery and the hashed key (or potentially, a QR code representative of the hashed key). The drone 110 stores the instruction (including the hashed key and/or QR code) in memory (e.g., the memory 204, etc.) and initiates, at 330, flight to the location of delivery. In addition, the parcel provider 102 transmits, at 332, a delivery initiated notification to the communication device 106, and in particular, to the application 118, which indicates to the user 108 that delivery of the parcel has initiated and which includes at least the drone ID (but which may further include, in other embodiments, the timestamp at which the hashed key was generated and/or the hashed key itself, etc.).

Upon receipt of the drone 110 at the delivery location, the user 108 access the application 118, whereupon the communication device 106 generates, at 334, a hashed key based on the drone ID received from the parcel provider 102 (in the notification at 332), the passport number for the passport being delivered to the user 108 (broadly, the unique identifier for the parcel), as included in the identifying data for the user 108 at the communication device 106, and the timestamp representative of the time, for example, at which the hashed key was generated (again, simply to help ensure that a static hashed key is not being used by the communication device 106, etc.). In general, the communication device 106 generates the hashed key in the same manner as the parcel provider 102, whereby the hashed keys should match when the same input data is used (e.g., when the user 108 is the intended recipient of the parcel included in the drone 110, etc.). The communication device 106 then further generates a QR code, at 336, in this embodiment (or, potentially, another computer-readable indicia), which is representative of the hashed key. And, the communication device 106 displays, at 338, the QR code at the presentation unit 206 thereof.

Then, while having possession of the drone 110, the user 108 selects an input on the drone 110, at 340, and presents the QR code at the communication device 106 to the drone 110. The drone 110, in turn, captures an image of the QR code, at 342. At 344, the drone 110 compares the hashed key captured as the QR code from the communication device 106 and the hashed key received from the parcel provider 102 in the delivery instruction (potentially, after converting the QR code back to the hashed key, etc.) (e.g., determines if they match or not, etc.). When there is a match (based on generally known techniques for comparing hashed keys), the drone 110 actuates, at 346, the locking mechanism 116 of the drone 110 to enable the user 108 to retrieve the parcel from the compartment 114 of the drone 110, thereby providing verified delivery of the parcel to the user 108. When there is not a match, the drone 110 maintains the locking mechanism 116 in a locked state thereby preventing delivery of the parcel for failure of verification of the user 108.

In the above description of the method 300, the hashed key is provided (via the QR code) by the user 108 to the drone 110 as an image captured or scanned by the drone 110 (e.g., by an input device 208 of the drone, etc.). In other embodiments, the hashed key may be presented by the communication device 106 to the drone 110 in other manners, for example, contactless communication (e.g., NFC communication, Bluetooth communication, etc.). Regardless of the communication medium, though, the content of the communication (and the data associated therewith) will generally remain the same as described above.

In some embodiments, when the user obtains the drone 110 for delivery of the parcel, in addition to confirming (e.g., matching, etc.) the hashed keys, the drone 110 may also require the user 108 to provide payment for delivery of the parcel (e.g., for the passport included in the parcel in this example, etc.) or for the parcel itself prior to actuating the locking mechanism. In these embodiments, the communication device may further provide payment account credentials to the drone 110, for a payment account associated with the user 108, whereby the drone 110 (via the parcel provider 102) may initiate a payment account transaction for any costs associated with the delivery and/or the product included in the parcel. In connection therewith, the communication device 106 may provide the payment account credentials to the drone 110 by way of a token or other encrypted medium, whereby the drone 110 and/or the parcel provider 102 are not in actual possession of the credentials (but instead a token or other representation thereof).

In some embodiments, a method is provided for distributing parcels to users by unmanned devices (e.g., drones, planes, balloons, etc.), whereupon the users are verified to facilitate delivery of the parcels. In one such embodiment, a method includes positioning a parcel in a drone for delivery to a user and scanning, by a computing device (e.g., associated with a parcel provider tasked to distribute the parcel to the user, etc.), a drone ID from the drone. The method also includes generating, by the computing device, a hashed key for delivery of the parcel to the user, based on the drone ID and a unique ID associated with the parcel, and providing a delivery instruction to the drone where the delivery instruction include a hashed key and a delivery location for the parcel thereby permitting the drone to initiate flight to the delivery location included in the delivery instruction. The method then includes transmitting, by the computing device, to a communication device associated with the user, a delivery initiated notification including the drone ID, thereby permitting the communication device to generate a hashed key identical to the hashed key generated by the computing device based on the drone ID to verify the identity of the user associated with the communication device.

In view of the above, the systems and methods herein provide for verified delivery of parcels, by parcel providers, to users via unmanned devices through use of digital identities of the users. In particular, for example, where an identity of a user is bound to a communication device, a parcel is secured within an unmanned device which travels to the user. The communication device (as associated with the user) is then the key, based on hashed shared data between the parcel provider and the user's communication device, to unlock the unmanned device and retrieve the parcel. In this manner, the communication device, already in the possession of the user, is expanded to provide efficient identification of the user and, consequently, to verify delivery of the parcel by the unmanned device. As such, parcels may be provided to users herein by the unmanned devices, in a manner that still ensures the actual users for whom the parcels are intended receive the parcels.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) actuating, by a computing device associated with an unmanned device, a locking mechanism associated with a compartment of the unmanned device to secure a parcel within the unmanned device; (b) receiving, at the computing device, from a parcel provider associated with delivering the parcel to a user, a delivery location and a hashed key for the parcel, the hashed key based on an ID of the unmanned device and a unique ID associated with the parcel; (c) when at the delivery location of the parcel, capturing an image of a computer-readable indicia representative of a hashed key from the user; (d) determining, by the drone computing device, that the hashed key from the user and the hashed key received from the parcel provider match; (e) when the hashed keys match, actuating the locking mechanism associated with the compartment of the unmanned device to enable the user to access the compartment and retrieve the parcel; and (f) receiving, at the computing device, an input indicating that the parcel is included in the compartment, prior to actuating the locking mechanism associated with the compartment to secure the parcel within the unmanned device.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for distributing parcels to users by way of unmanned devices, whereupon identities of the users are verified in order to complete delivery of the parcels from the unmanned devices to the users, the method comprising:

prior to travel by an unmanned device to a delivery location:
actuating, by a computing device of the unmanned device, a locking mechanism associated with a compartment of the unmanned device to secure a parcel within the unmanned device; and
receiving, at the computing device, from a parcel provider associated with delivering the parcel to a user, the delivery location and a hashed key for the parcel, the hashed key representative of an ID specific to the unmanned device, a unique ID associated with the parcel, and a timestamp specific to generation of the hashed key for the parcel; and then
when the unmanned device is at the delivery location of the parcel, capturing, by the computing device, an image of a computer-readable indicia representative of a hashed key from the user;
determining, by the computing device, whether the hashed key from the user and the hashed key received from the parcel provider match; and
in response to the hashed keys from the user and from the parcel provider matching, actuating, by the computing device, the locking mechanism associated with the compartment of the unmanned device to provide the user with access to the compartment and the parcel.

2. The method of claim 1, further comprising receiving, at the computing device, an input indicating that the parcel is included in the compartment, prior to actuating the locking mechanism associated with the compartment to secure the parcel within the unmanned device.

3. The method of claim 1, wherein the delivery location includes one of a mailing address and a location of a portable communication device of the user.

4. The method of claim 3, wherein the delivery location includes the location of the portable communication device; and
wherein the method further includes receiving, by the computing device, a beacon transmission from the portable communication device and determining, by the computing device, the location of the portable communication device based on the received beacon transmission.

5. The method of claim 1, wherein the computer-readable indicia includes a QR code.

6. The method of claim 5, wherein the parcel includes a government document and the unique ID includes a government ID number included on the government document.

7. The method of claim 5, wherein the unmanned device includes a drone.

8. A non-transitory computer-readable storage medium including executable instructions for distributing parcels to users by way of an unmanned device, which, when executed by a processor associated with the unmanned device, cause the processor to:
prior to travel of the unmanned device to a delivery location:
actuate a locking mechanism associated with a compartment of the unmanned device to secure a parcel within the unmanned device; and
receive from a parcel provider associated with delivering the parcel to a user, the delivery location and a hashed key for the parcel, the hashed key representative of an ID specific to the unmanned device, a unique ID associated with the parcel, and a timestamp specific to generation of the hashed key for the parcel; and then
capture an image of a computer-readable indicia representative of a hashed key from the user at the delivery location;
determine whether the hashed key from the user and the hashed key received from the parcel provider match; and
in response to a match of the hashed keys captured from the user and received from the parcel provider, actuate the locking mechanism associated with the compartment of the unmanned device to enable the user to access the compartment and retrieve the parcel.

9. The non-transitory computer-readable storage medium of claim 8, wherein the executable instructions, when executed by the processor, further cause the processor to receive an input, from the parcel provider, indicating that the parcel is included in the compartment, prior to actuating the locking mechanism associated with the compartment to secure the parcel within the unmanned device.

10. The non-transitory computer-readable storage medium of claim 9, wherein the delivery location includes one of a mailing address and a location of a portable communication device of the user.

11. The non-transitory computer-readable storage medium of claim 10, wherein the delivery location includes the location of the portable communication device; and
wherein the executable instructions, when executed by the processor, further cause the processor to receive a beacon transmission from the portable communication device and determine the location of the portable communication device based on the received beacon transmission.

12. The non-transitory computer-readable storage medium of claim 8, wherein the unmanned device includes a drone.

13. The non-transitory computer-readable storage medium of claim 12, wherein the computer-readable indicia includes a QR code.

14. A drone for distributing parcels to users, whereupon identities of the users are verified in order to complete delivery of the parcels, the drone comprising:
a storage compartment;
a locking mechanism associated with the storage compartment, the locking mechanism moveable between a locked position and an unlocked position to allow selective access to the storage compartment; and
a computing device disposed onboard the drone, the computing device configured to:
prior to travel of the drone to a delivery location:
actuate the locking mechanism to the locked position to secure a parcel within the storage compartment; and
receive, from a parcel provider associated with drone, the delivery location and a hashed key for the parcel, the hashed key representative of an ID specific to the drone, a unique ID associated with the parcel, and a timestamp specific to generation of the hashed key for the parcel; and then
capture an image of a computer-readable indicia representative of a hashed key from the user while the drone is disposed at the delivery location;
determine that the hashed key from the user and the hashed key received from the parcel provider match, thereby verifying the user as an intended recipient of the parcel; and in response to the determined match, actuate the locking mechanism to the unlocked position to enable the user to access the storage compartment and retrieve the parcel.

15. The drone of claim 14, wherein the storage compartment further includes an access panel moveable between an open position and a closed position; and wherein the computing device is configured, in connection with actuating the locking mechanism to the locked position, to actuate the locking mechanism to the locked position when the access panel is in the closed position to thereby secure the parcel within the storage compartment.

16. The drone of claim 15, wherein the locking mechanism includes a digital locking mechanism.

17. The drone of claim 14, wherein the computing device is further configured to receive an input, from the parcel provider, indicating that the parcel is included in the compartment, prior to actuating the locking mechanism to the locked position to secure the parcel within the storage compartment.

18. The drone of claim 14, wherein the delivery location includes one of a mailing address and a location of a portable communication device of the user.

19. The drone of claim 18, wherein the delivery location includes the location of the portable communication device; and wherein the computing device is further configured to receive a beacon transmission from the portable communication device and determine the location of the portable communication device based on the received beacon transmission.

20. The drone of claim 14, wherein the computer-readable indicia includes a QR code.

* * * * *